March 27, 1951 W. W. PAGET 2,546,613
CONTROLLING APPARATUS
Filed July 1, 1946 5 Sheets-Sheet 1

Inventor:
Win W. Paget.
by
Louis A. Mason
Atty.

March 27, 1951 W. W. PAGET 2,546,613
CONTROLLING APPARATUS
Filed July 1, 1946 5 Sheets-Sheet 2

Inventor:
Win W. Paget.
by
Louis A. Mason.
Att'y.

March 27, 1951 W. W. PAGET 2,546,613
CONTROLLING APPARATUS
Filed July 1, 1946 5 Sheets-Sheet 3

Inventor:
Win W. Paget.
by
Louis A. Maxson.
atty.

Patented Mar. 27, 1951

2,546,613

UNITED STATES PATENT OFFICE 2,546,613

CONTROLLING APPARATUS

Win W. Paget, Michigan City, Ind., assignor to Joy Manufacturing Company, a corporation of Pennsylvania Application July 1, 1946, Serial No. 680,671

31 Claims. (Cl. 230—5)

My invention relates to controlling apparatus, and more particularly to apparatus for automatically controlling the operating speed and the loading and unloading of pumps—particularly air compressors—in accordance with pump discharge pressure changes.

In the operation of internal combustion engine driven compressors, it is desirable (1) that while the compressor discharge pressure is in the desired range of, for example, 90 to 100 pounds, the speed of the compressor be controlled generally inversely to the pressure, so that to the extent possible the compressor may be operated continuously in such a manner as to maintain the discharge pressure within such limits merely by control of its speed; (2) that, if the demand for air be so low that even at the lowest normal loaded operating speed the discharge pressure cannot be kept from exceeding the desired upper limit of the desired range, then, after operation at such lowest normal loaded operating speed until the discharge pressure exceeds the desired upper limit by a predetermined substantial amount, say 10 pounds, the compressor be unloaded and be slowed down to a substantially lower, idling speed; (3) that the compressor thereafter be operated unloaded at such idling speed until the discharge pressure falls at least substantially said predetermined amount and back to the upper limit of the desired pressure range and then be brought back to the lowest normal loaded operating speed and reloaded; and (4) that there then be either (a) a gradual speeding up if compressor discharge pressure continues to fall, or (b) operation at said lowest normal loaded operating speed if compressor discharge pressure remains constant or increases an amount less than the predetermined amount previously mentioned, or (c) a return to unloaded condition and a repeated slowing down to an idling speed if the compressor discharge pressure again builds up the predetermined amount above mentioned. In such a system it is desirable that the controlling devices be as simple as possible, that they be adjustable to alter the critical pressures in a simple manner, that as fully as possible the controls be under the regulation of a minimum number of compressor discharge pressure responsive devices and use a minimum number of pilot mechanisms, and that control mechanisms be provided which shall be usable with minimum change and with a minimum of different adjuncts for the control of gasoline engine and Diesel engine driven compressors. It is further desirable, particularly where no clutch between the engine and compressor is employed, that there be arrangements which will permit the unloading of the compressor and the slowing down of the engine before the stopping of the latter when it is desired to shut down the engine-compressor unit.

To meet the objectives set forth, I prefer to employ, in a preferred embodiment thereof, a primary control mechanism which includes a pressure responsive element of relatively substantial area subjected on one side to the pressure which is to be controlled (compressor discharge pressure) and on its other side to a pressure which is automatically prevented from exceeding a value which is a predetermined amount less than the lower limit of the desired working pressure range of the compressor. Desirably, means is provided whereby the pressure to be maintained on the last mentioned side of said pressure responsive element may be increased or diminished through a single adjustment, whereby the working pressure range of the compressor may be readily adjusted. Desirably, moreover, means is provided whereby the pressure on the last mentioned side of the pressure responsive element may be bled off when it is desired to stop the engine-compressor unit, with the result that, regardless of the receiver pressure, and whether or not at such receiver pressure the engine may be operating at speeds above the minimum desired loaded working speed, the compressor may be unloaded, and the engine brought to an idling speed, before it is stopped. Desirably, also, the pressure responsive element acts on another element which is movable to effect a reduction in the operating speed of the compressor as compressor discharge pressure increases and which, in a predetermined position thereof and after an increase in compressor discharge pressure a predetermined amount above the upper limit of the desired working pressure range, also acts upon a device which is operable to effect a supply of fluid to cause compressor unloading and the slowing down of the compressor to an idling speed. Desirably, the structure of said device for effecting the supply of pressure for the purposes last mentioned is such that there will be required a reduction in compressor discharge pressure substantially equal in amount to the predetermined increase, before speeding up and reloading will take place. Desirably, the primary control mechanism in a gasoline engine driven compressor will act in cooperation with a speed governor and will alter the spring force to which the speed governor is subjected and will thus control the positioning by the speed governor of a throttle in the compressor intake, while "slow down" will be effected through another throttle in the carburetor. In a Diesel engine driven compressor, such primary control mechanism and the slow down device which it controls may desirably both be operable, but sequentially, to affect the tension of a spring in the governor controlled mechanism which regulates fuel injection.

It is an object of my invention to provide an improved controlling apparatus for a compressor driven by an internal combustion engine, such as a gasoline or Diesel engine. It is a further object of my invention to provide an improved apparatus for controlling the speed of an internal combustion engine driven compressor for adjusting the delivery of air to the air demand and for unloading the compressor and further reducing the speed of the compressor to an idling speed when the demand for air becomes so low that loaded operation of the compressor without building up an undesired high pressure becomes impracticable. It is still another object of my invention to provide an improved controlling mechanism of the character referred to having improved means for adjusting the position of the working cycle on a pressure-speed chart. It is yet another object of my invention to provide an improved controlling mechanism of the character referred to, having improved arrangements for effecting the slowing down of the engine and the unloading of the compressor very promptly at any time when it is desired to stop the engine, it being particularly desirable that, in the absence of any clutch between the engine and the compressor, the compressor shall be unloaded before stopping. It is yet a further object of my invention to provide an improved controlling mechanism of the character mentioned which shall avoid all necessity for high pressure differentials at opposite sides of flexible pressure actuated operating elements. It is broadly an object of my invention to provide an improved pump control. Still another object of my invention is to provide an improved internal combustion engine driven air-pumping apparatus having an improved speed controlling and unloading system associated therewith. Other objects and advantges of my invention will hereinafter more fully appear.

In the accompanying drawings, in which, for purposes of illustration, two illustrative embodiments of my invention are shown.

Referring to the drawings, and initially to Figs. 1 to 9, my improved controlling mechanism is shown in these figures associated with a gasoline engine, for controlling the supply of combustible mixture to the latter in desired relation to variations in pressure in the receiver of a compressor system, and for controlling the unloading of the compressor driven by said engine. The gasoline engine, generally designated 1, has a carburetor 2, between which and the engine a throttle valve 3 is arranged (Fig. 1) and this throttle valve is controlled by my improved controlling mechanism generally designated 4. The power shaft of the engine is operatively connected, by means not shown, to a compressor of which one piston is shown at 6 in Fig. 2; and the engine effects reciprocation of the piston 6 in a cylinder bore 8 formed in a cylinder block 9. It will be understood that other compressor cylinders containing pistons connected for reciprocation by the power shaft may be provided if desired, and that such will ordinarily be used. Fluid is admitted through an intake passage 11 and past an inlet valve 12 to the cylinder bore 8, where it is compressed and whence it is discharged past a discharge valve 14 to a passage 15 which is connected, by suitable connections not shown, to a receiver 16 shown in Fig. 1. The receiver 16 has a valve-controlled connection 16' through which compressed air can be led off to any desired point of use, and another valve-controlled connection 16" which may be used to permit the blowing down of the receiver and the prevention of the building up of pressure therein when desired, as during the starting of the compressor unit. The cylinder 9 has a head 18 connected thereto by bolts 19, and attached to the head, as by bolts 20, is a member 22 having a chamber 23 which receives a piston 25 having connected to it a plate 26. Rods or fingers 27 connected to the plate 26 extend through openings in the cylinder head to engage the inlet valve 12, for unseating the latter and effecting an unloading of the compressor cylinder when the piston 25 is subjected to pressure fluid. The piston 25 is normally held in its raised position by a spring 28 and is adapted to be forced to its lower position against the action of the spring 28 by pressure fluid supplied to the chamber 23 through a conduit 30.

Figure 1:
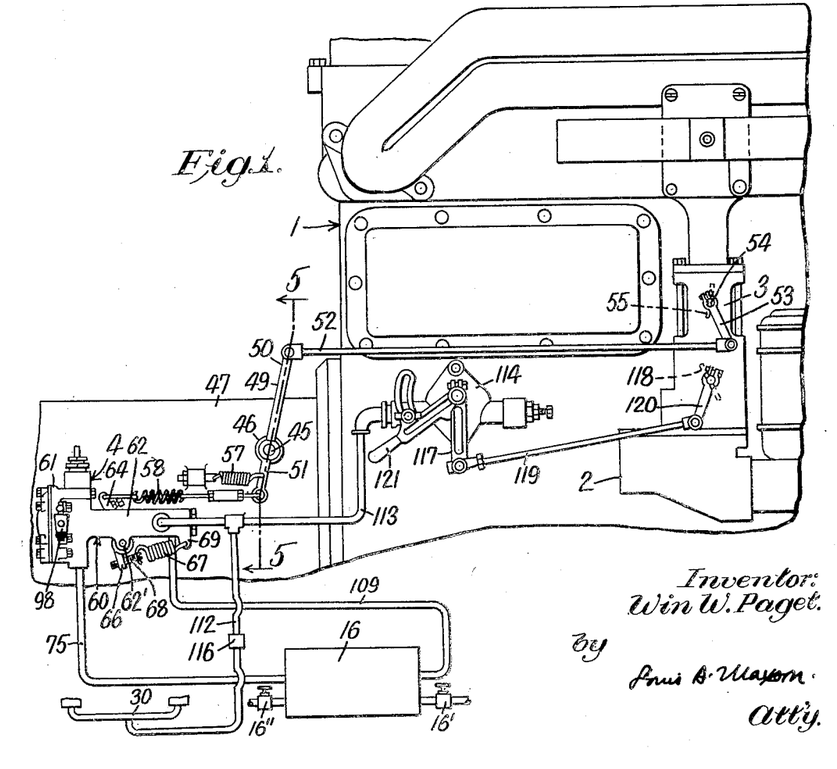
Fig. 1 is a fragmentary view of a gasoline engine with which one illustrative embodiment of a controlling mechanism according to one aspect of my invention is associated, enough additional parts being shown to provide a diagrammatic view of the whole system of which the engine and control elements shown form a part.
Figure 2:
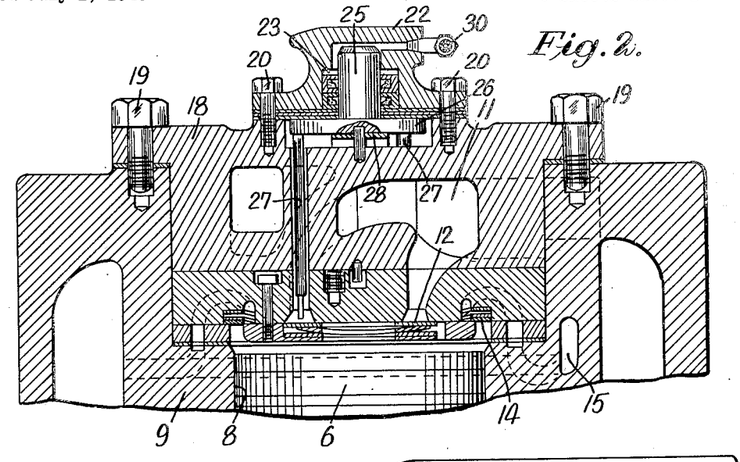
Fig. 2 is an axial sectional view through the cylinder head, inlet and discharge valve mechanisms, unloading devices, and the head end of a compressor cylinder.
Figure 3:
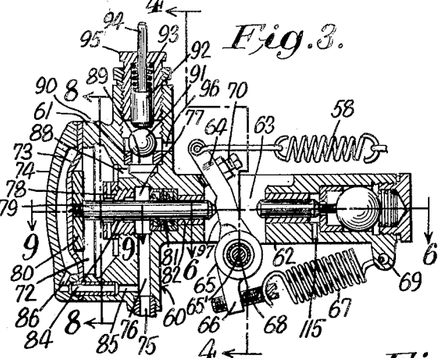
Fig. 3 is a vertical axial sectional view through the principal controlling unit of the improved controlling mechanism shown in Fig. 1.
Figure 4:
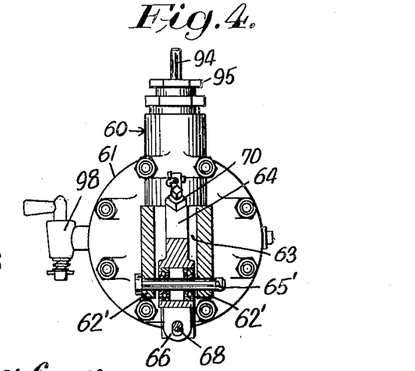
Fig. 4 is a vertical transverse section on the plane of the line 4—4 of Fig. 3.
Figures 5, 6, 7, 8, 9:
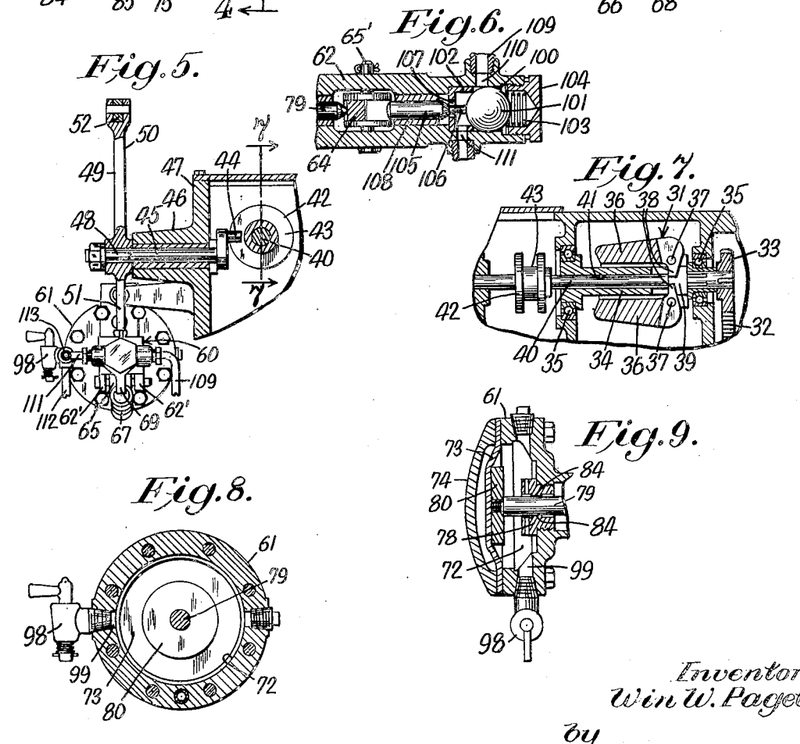
Fig. 5 is an enlarged section on the planes of the line 5—5 of Fig. 1.
Fig. 6 is a horizontal section on the plane of the line 6—6 of Fig. 3.
Fig. 7 is a section on the plane of line 7—7 of Fig. 5 through a part of a speed governor mechanism.
Fig. 8 is a vertical transverse section on the plane of the line 8—8 of Fig. 3.
Fig. 9 is a fragmentary horizontal section on the plane of the line 9—9 of Fig. 3.

The engine 1 has a centrifugal governor generally designated 31 and shown in Fig. 7. This governor is driven from any suitable rotating part of the engine, as through a spur gear train 32, 33, the gear 33 of which rotates a shaft 34 suitably supported in bearings 35, 35. The shaft 34 carries governor weights 36 pivotable on axes 37 and having arms 38 extending into a transverse slot 39 in the shaft 34 and acting within said slot on the end of a shaft 40 which is slidably mounted in a bore 41 within the shaft 34. The shaft 40 carries a spool 42, into the groove 43 of which extends a pin 44 carried in offset relation by a shaft 45 pivotally supported in a bearing boss 46 shown herein as projecting from the side of the transmission casing 47 of the engine. The shaft 45 has keyed to it at 48 a lever 49 comprising an upper arm 50 and a lower arm 51. The upper arm 50 of the lever is connected by a link or operating rod 52 to an arm 53 which is connected to a supporting shaft 54 by which the butterfly valve 55 of the throttle valve 3 is carried. It will be observed that outward swinging movement of the weights 36 as the engine speeds up pushes the shaft 40 in a direction to cause the lever 49 to swing counterclockwise in Fig. 1 and thus to turn the butterfly valve 55 clockwise in that figure and so to effect throttling of the engine. The action under centrifugal force of the governor weights is opposed by a spring system consisting of two springs 57 and 58. The spring 57 is of such strength that when it is not assisted in any way by the spring 58 it will offset the force produced by the governor weights 36 at a position of the lever 49 in which the throttle valve 3 will cause the engine to operate at about 800 R. P. M. As will shortly be described, means is provided such that the spring 58 may exert variable forces on the lever 49, including a maximum force sufficient when added to the force exerted by the spring 57 to maintain the butterfly valve 55 in a position to effect operation of the engine at, say 1450 R. P. M., and various lesser forces down to zero.

For controlling the tension of the spring 58, and for controlling also the supply of fluid to a slowdown and unloading system which will later be described, I have provided the improved structure illustrated in Figs. 1, 3, 4 and 6. It will be observed that the controlling mechanism generally designated 4 includes a casing 60 which is mounted on the side of the engine in any suitable manner and comprises a casing head portion 61 and a projecting, generally horizontal casing portion 62. Between the ends of the horizontal portion 62 there is a transverse, herein vertical, slot 63 in which there is swingable the upper arm 64 of a lever 65 which is journaled on a pin 65' carried by ears 62' depending from the horizontal portion 62. The lever 65 has also a lower arm 66 to which a spring 67 is adjustably connected, as at 68, the other end of the spring being connected to a depending boss 69 at the outer end of the portion 62. The strength of the spring 67 is sufficient to maintain the lever arm 64 in the position shown in Fig. 3 when there is no force exerted on the lever 65 by the pressure responsive devices shortly to be described. An adjusting screw 70 is provided for adjusting the extreme angular position of the lever arm 64 in a counterclockwise direction about its pivot. In the position of the parts shown in Fig. 3, the spring 58 is tensioned sufficiently to cause, by the addition of its pull to that exerted by the spring 57, engine operation at approximately 1450 R. P. M.

Within the head portion 61 of the casing 60 there is formed a chamber 72 whose outer end is closed by a flexible diaphragm 73 clamped between a recessed head 74 and the part of the head portion 61 which is integral with the horizontal portion 62. A passage 75 leading from the receiver 16 communicates with a passage 76 in the head portion 61, and the passage 76 opens into a chamber 77 coaxial with the chamber 72 and separated from the latter by a threaded, axially and radially bored member 78. A plunger or operating rod 79 is reciprocable axially of the chambers 72 and 77 and has an extended head 80 engaging the diaphragm 73. A packing 81 and a bushing 82 prevent leakage along and guide the right hand end of the plunger 79 in Fig. 3. The member 78 does not, however, fit tightly about the plunger 79, so that there is a restricted communication, through an annular space 84 around the plunger 79, between the chambers 77 and 72. A branch passage 85 connects the passage 76 with a passage 86 in the head 74 and these passages deliver receiver pressure freely to the space between the head 74 and the diaphragm 73. The chamber 72 communicates through a passage 88 with another chamber 89 whose lower end receives a valve seat member 90 upon which a ball valve 91 is adapted to seat. The ball valve is normally held on its seat by a plunger 92 upon which a spring 93 acts. The plunger has a projecting stem 94 which the spring 93 surrounds; and an adjustable follower 95 houses the spring and guides the stem and plunger, and is adjustable to vary the force under which the ball valve is maintained seated. When the ball valve is unseated, the chamber 89 is connected with a side vent 96 opening to the outside of the casing 61. It will be observed that there is exerted on the diaphragm 73 at the left hand side thereof full receiver pressure, while on the right hand side of the diaphragm in chamber 72 there is maintained a pressure whose relation to the receiver pressure may be varied by adjusting the compression of the spring 93. Ordinarily, the compression imposed upon this spring will be such as to permit unseating of the valve when the pressure within the chamber 72 gets to a value approximately 15 pounds per square inch less than the pressure at the other side of the diaphragm at which it is desired to commence to reduce the engine speed. It will be observed that this arrangement reduces the unbalanced unit forces acting on the diaphragm 73, and while, because of the size of the diaphragm, entirely adequate operating forces are exerted on the rod 79, the diaphragm is not subject to serious danger of rupture. The plunger 79 engages a flattened surface 97 on the lever arm 64. With a receiver pressure of about 90 pounds and a pressure within the chamber 72 of about 75 pounds, the force exerted by the plunger 79 on the lever arm 64 will be such that any increase in receiver pressure will cause the plunger to start to swing the lever arm clockwise. If it were desired that slowing down should not commence until the pressure in chamber 72 would be 92 pounds, a slight increase in compression of spring 93 would produce this result.

Where, as with the engine driven compressors of the design with which my improved controlling mechanism is particularly intended to be used (though this controlling mechanism is in no sense limited to such use), the relatively small displacement of the engine and compressor makes unnecessary the use of a clutch, it is particularly desirable that means be provided for insuring the unloading of the compressor before stopping of the driving engine. The mechanism which I have described makes this most readily possible, and I have provided, as illustrated in Figs. 1, 4, 5, 8 and 9, a drain cock 98 arranged at the mouth of a passage 99 communicating with the chamber 72. It will be evident that when this drain cock is opened the pressure may be bled off from the chamber 72 more rapidly than it can enter through the annular passage 84, and accordingly, even though the receiver pressure might be so relatively low that the parts would be in the position shown in Fig. 3, the compressor may be quickly unloaded and slowed down by opening the drain cock, because a pressure of 90 pounds, say, acting on the left hand side of the diaphragm 73 would then be opposed by a pressure which would quickly be reduced to atmospheric and which, when reduced to 80 pounds, would permit the lever arm 64 to swing to the right to slow the engine down to minimum normal loaded running speed, and would permit unloading and a further reduction in speed to the idling rate, through the instrumentalities which will immediately be described, when the pressure in the space 72 fell to 70 pounds.

In the outer end of the casing portion 62 there is arranged a chamber 100 in which a ball valve 101 is mounted, this ball valve normally engaging a seat upon a valve seat member 102 mounted in the chamber, said ball valve being held against its seat by a spring 103 whose compression is adjustable by a spring-housing follower 104. A plunger 105 has a reduced portion 106 extending through an opening 107 in the center of the valve seat member 102, and is guided in a bushing 108. A connection 109 from the receiver 16 opens at 110 through the wall of the casing portion 62, at a point to the right of the valve seat in Fig. 3; and subjects the ball 101 to a seating pressure supplementing the pressure of the spring 103. When the ball is unseated, pressure fluid may flow from the chamber 100 through a passage 111 opening through the side of the valve seat member 102 and the casing portion 62 to the left of the valve seat provided by the member 102 and communicating through branches 112 and 113 respectively with the unloading plunger connections 39 and a slowdown device of conventional form 114. When the lever arm 64 has been moved clockwise sufficiently far to remove all tension from the spring 58 (a position it attains when receiver pressure is about 100 pounds under present assumptions) it contacts the end of the plunger 105, and upon further movement will unseat the ball valve 101 and cause the delivery of fluid to unload the compressor and to slow down the engine 1. The plunger 105 would then seal the opening 107, which in another position of the plunger 105 may be connected through a port 115 to atmosphere. There is provided in the branch 112 a conventional valve device 116 which permits unrestricted flow of fluid toward the unloading devices but restricts the reverse flow of fluid so that the engine will have an opportunity to speed up somewhat from its idling speed before a pumping load is again placed on it. The slowdown device 114 includes pressure fluid operated means for moving a lever 117 to actuate a slowdown throttle 118 in the carburetor 2 by a suitable link and arm mechanism 119, 120. This slowdown mechanism, when supplied with receiver pressure, will position the throttle 118 to effect engine operation at a suitable idling speed, say at about 450 R. P. M. A conventional manual adjusting and holding means 121 is provided, to enable holding the throttle 118 in desired position during starting, etc. A manually controllable unloading bypass or bleeder (not shown) or other suitable means may be provided to keep the compressor unloaded during warming up, if desired.

The mode of operation of the mechanism thus far described may be quickly summarized. Assume that the compressor is being started with no pressure in the receiver 16. The operator will desirably open the bleeder 16'' in order to prevent the building up of any material pressure in the receiver. Then by means of lever 121, arm 117, link 119 and arm 120, the throttle valve will be moved to idling speed position and the compressor, upon the starting of the engine, will pump air into the receiver, but the air will be simultaneously discharged from the receiver through the opened discharge connection 16'' until the engine and compressor are warmed up. Two things will then be possible, but normally there will be no occasion for further delay in starting to pump up the compressor pressure to the desired value, and accordingly, with the closing of the vent connection 16'' and the discontinuation of the manual control, the compressor will be loaded and the engine speed will increase to its maximum of 1450 R. P. M., because there will be no effective force to move the lever 64 clockwise in Fig. 3 until after the necessary minimum pressure differential at the opposite sides of the diaphragm exists, and under the operating conditions commonly maintained this maximum speed will be maintained until the pressure in the receiver reaches 90 pounds.

Another procedure would be possible but is normally unnecessary. According to this alternative procedure the manual control of the slowdown may be effected through manipulation of the lever 121 and the compressor be caused to operate at 450 R. P. M. because the throttle 118 in the carburetor would be held in a position to effect such operation by the adjustment of the lever 121. Just as long as that control is maintained, the automatic control can do nothing to increase the speed of the compressor. With respect to the operation effected by the mechanism particularly illustrated in Fig. 3, it will be appreciated that when there is no receiver pressure there is no pressure at either side of the diaphragm. The compressor will therefore be in a loaded condition, and will build up a load when it begins to turn over, unless the receiver 16 is being vented, because there is no pressure to act on the inlet valve unseating plungers. Now, if the bleed or vent cock 98 is open, as soon as the receiver pressure reaches a value of 15 pounds and passes above this progressively to 16, 17, 18, etc. pounds, there will be a differential pressure between the side of the diaphragm subjected to receiver pressure and the vented side sufficient to cause the diaphragm to commence to move the plunger 79 and to commence to move the throttle valve in the intake toward closed position, but this will not have any effect on the compressor speed because the compressor is already operating more slowly than any speed to which the operation of the economizer lever could reduce it. When the receiver pressure reaches 25 pounds per square inch, the plunger 79 will have moved the lever arm 64 over into contact with the plunger 105, but this will not effect unseating of the ball valve 101 because a differential pressure between the left and right hand sides of the diaphragm 73 of 35 pounds per square inch is necessary to effect unseating of the ball valve 101. When the receiver pressure reaches 35 pounds per square inch, with the vent cock 98 still open, the compressor will be unloaded, and it will remain unloaded until the vent valve is closed, and it will continue to operate at the 450 R. P. M. speed until the manual control of the slowdown is made inoperative. If the manual control of the slowdown is discontinued before the vent cock 98 is closed, the compressor will speed up to approximately 800 R. P. M. and will remain unloaded. If the vent cock is then closed, the compressor will be loaded and the speed of operation will increase promptly to 1450 R. P. M. This mode of operation is not, however, necessary, or usually bothered with, in starting the compressor.

When the receiver pressure reaches 90 pounds, with the vent cock 98 closed (90 pounds is being selected by way of example), the pressure differential (15 pounds per square inch, on the hypothesis earlier stated) between the left and right hand sides of the diaphragm 73 will be great enough to provide a force any increase in which will cause the plunger 79 to start to swing the lever arm 64. A slight increase in the compression of spring 93 would make, say, 92 pounds the critical pressure, and a slight slackening of the compression of the spring 93 would make, say, 88 pounds the critical one. When the pressure begins to rise above 90 pounds, the engine speed starts to decrease in proportion to the air pressure increase, as the diaphragm 73 forces the plunger 79 toward the right in Fig. 3 and swings the lever 64 clockwise and reduces the tension of the spring 58; and by the time the pressure reaches 100 pounds, if it builds up to that point, the apparatus will be operating at only 800 R. P. M., and the spring 58 will then be completely untensioned and the opposition to the governor weights will be furnished entirely by the spring 57. If the pressure, instead of continuing to rise to 100 pounds, began to drop off before the value of 100 pounds was reached, the lever arm 64 would cease to move in a clockwise direction and begin to move counterclockwise under the action of the spring 67, and the engine would again speed up in general proportion to the drop in pressure. Essentially, between 90 and 100 pounds pressure in the receiver, under the setting assumed, the engine speed varies between 1450 and 800 R. P. M., inversely with receiver pressure.

If the receiver pressure builds up to 100 pounds and still continues to rise, no further reduction in engine speed takes place until the air pressure reaches 110 pounds, at which point the lever 64 acts strongly enough upon the plunger 105 to unseat the ball valve 101, and thereupon the compressor is unloaded by fluid flowing from the receiver 16 through the conduit 109, the port 110, past the unseated valve 101, through the passage 111, branch 112, the valve device 116, and the branches 30 to act on the unloading plungers 25. Moreover, fluid will pass through the connection 113 to the device 114 and the latter will move the throttle 118 to a position to cut down engine operating speed to an idling speed, say 450 R. P. M.

The unit then will remain unloaded and idling until the pressure drops back to 100 pounds, at which point the valve 101 will seat again, cutting off the supply of fluid to the unloading mechanism and to the slowdown device 114 and permitting fluid previously supplied to them to vent through the passage 111, and through the then open clearance around the plunger reduced portion 106 in opening 107, and through port 115. This delay may be understood when it is noted that a substantial increase in the area of the valve 101 subjected to receiver pressure takes place when the valve opens—indeed there is a reduction in the force tending to close the valve equal to the pressure multiplied by the area sealed off from receiver pressure when the valve is seated, so the receiver pressure must drop substantially the amount of the increase which was required to effect valve opening before valve reclosure will take place. The compressor speed will then come up substantially immediately to 800 R. P. M., reaching this speed approximately by the time reloading takes place, because of the presence of the delay device 116. When the speed reaches 800 R. P. M. what will occur next will depend upon whether the pressure starts to rise or fall, that is, whether less air is being used than is delivered at the rate of 800 R. P. M. or whether more air than that is being used. If the pressure starts to rise, the speed will remain at 800 R. P. M., and if the pressure again reaches 110 pounds, the compressor will again unload and slow down to idling speed. On the other hand, if the pressure starts to fall below 100 pounds, the speed will increase proportionately, up to a maximum of 1450 R. P. M. if the receiver pressure falls sufficiently far.

When it is desired to stop the compressor driving engine, it is preferable, particularly where no clutch between the engine and driven compressor is provided, to unload the compressor and slow it down before taking action to shut down the engine if at the moment when stopping is desired the compressor is not already unloaded and being driven at the idling speed. The manipulation of the handle 121 would of course permit reducing the compressor to an idling speed, but this would be undesirable if the compressor were loaded, and so resort may be had to the bleed valve 98. Suppose that the receiver pressure is down to 90 pounds, with the lever arm 64 in the position shown in Fig. 3 and the compressor being driven at 1450 R. P. M. It is necessary only to open the vent cock 98 and to bleed down the pressure in the chamber 72, to effect the following results. As soon as the pressure begins to bleed out of the chamber 72, the then less, uncounterbalanced pressure on the left hand side of the diaphragm 73 will cause the plunger 79 to swing the lever arm progressively to the right in Fig. 3, and by the time that the pressure in the space 72 has been reduced ten pounds the compressor will have been slowed down to 800 R. P. M. By the time the pressure in chamber 72 has been reduced twenty pounds, the available force sufficient to unseat the valve 101 and effect unloading of the compressor and operation of the slowdown 114 will exist, and the compressor will be unloaded and slowed down, and ready for the stopping of its driving engine.

Before passing on to the description of another embodiment, it may be noted again that, merely by adjusting a single adjusting member, the member 95, the position of the operating cycle on the pressure speed chart may be moved up or down without the differentials being affected in any way. It is not necessary to make two or more simultaneous adjustments in order to shift the operating pressure range up or down, as is the case with other controls.

Turning now to the species of the invention illustrated in Figs. 10 to 22, inclusive, in which my improved control mechanism in a modified form is applied to a Diesel engine driven compressor, it should be recalled that Diesel engines are provided with built-in mechanism for controlling the injection of fuel. In one well known form of such an engine, in conjunction with which I have chosen to illustrate this embodiment of my invention, the fuel injection pump plunger is turned by a pinion connected to it and by a rack to one end of which a speed governor controlled shaft is connected. The other end of the rack is link-connected to a lever, herein shown at 125, to which a spring 126 is connected; and the tension of the spring is adjustable (and so the engine speed is also adjusted) by varying the position of a lever 127 to which the other end of spring 126 is connected. When the rack is moved back and forth by the opposed actions of the governor and of the spring 126, the fuel injection pump plunger is turned, and the amount of fuel injected is varied according to the load on the engine. This mechanism acts on all the injection pumps simultaneously so that an equal and correct amount of fuel is delivered to each cylinder. It is unnecessary to illustrate this well-known commercial mechanism other than to the extent shown, namely, the parts 125, 126 and 127. Obviously other fuel injection control mechanisms may be controlled by the basic control mechanisms of this embodiment of my invention.

Since, also in the control of a Diesel engine provided with governor mechanism of the character just mentioned, control of a single lever 127 instead of two levers 53 and 120 is employed, both for effecting normal speed variations and for effecting a slowdown concurrent with unload control, a substantially modified arrangement of controls is necessary. A mechanism 130 is provided which is essentially the same as the mechanism 60 of Fig. 3, except that the spring 58 is omitted, and that a continuous rod 131 is employed for transmitting, through mechanism shortly to be described, movements to the lever 127 which reduce the tension of the spring 126, and thereby effect a slowing down of the engine. A slowdown mechanism 133, very similar to the mechanism 114, is connected by a bracket plate 134 to the mechanism 130. The slowdown mechanism 133 includes a rocker shaft 135 to one end of which a lever 136 is connected. The lever 136 operates a rod 137 which is also adapted, under certain circumstances later described, to effect a control of the position of the lever 127. The rocker shaft 135 also carries an arm 138 (Fig. 20) pressed in one direction by a spring 139 and adapted to be moved in the opposite direction by a plunger 140 adapted to be actuated by a piston 141 in a cylinder 142 carried by a portion of the casing 143 of the slowdown mechanism, pressure being supplied through a connection 144 to the cylinder bore to act upon the piston 141 under the control of a valve corresponding to the ball valve 101 in the mechanism 130.

The lever 127 is secured to a shaft 145 and has a small projecting arm 146 which is adapted to cooperate with an adjustable stop 147 in determining the minimum tension of the spring 126 and so the idling speed of the Diesel engine. The shaft 145 carries a plural armed lever 148, which has an arm 149 upon which there acts a spring 150, whose other end is secured to a stationary, but desirably adjustable, point 151. Another arm 152 of the lever 148 has means at its swinging end through which it may be controlled by the mechanism 130 and by the slowdown mechanism 133.

Figure 10:
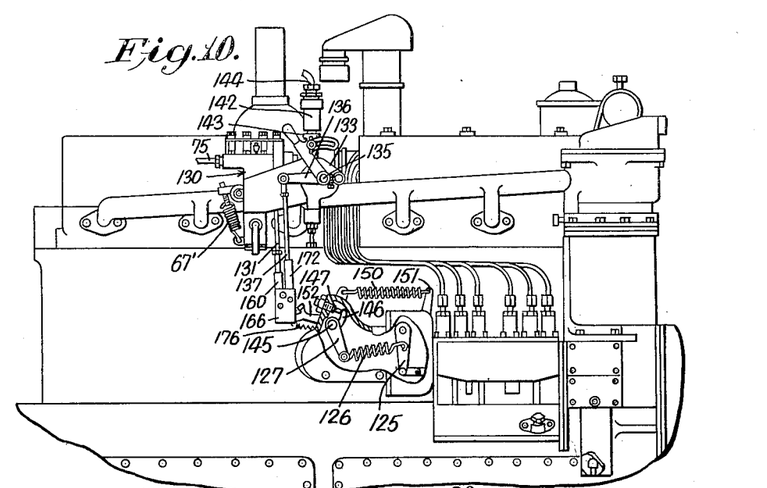
Fig. 10 is a side elevation of a portion of a Diesel engine provided with another embodiment of the control which constitutes one aspect of my invention.
Figure 11:
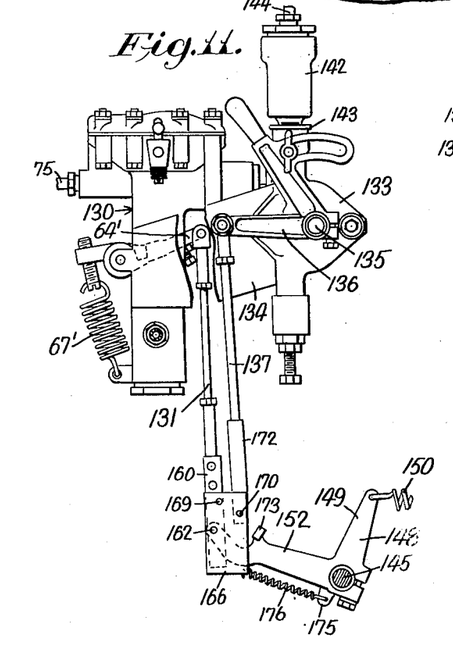
Fig. 11 is a view on an enlarged scale of the control mechanism of Fig. 10.
Figure 12:
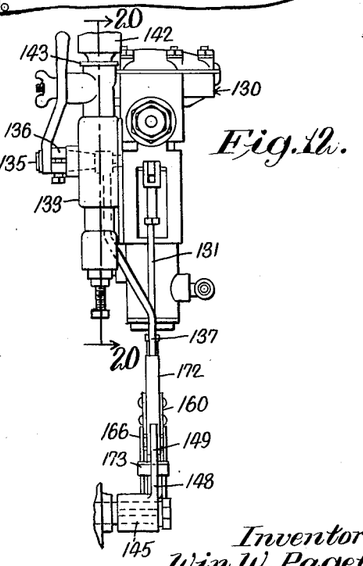
Fig. 12 is a view of the control mechanism of Fig. 11 viewed from a position in which the observer looks lengthwise of the engine.
Figures 13, 14, 15, 16, 17, 18, 19:
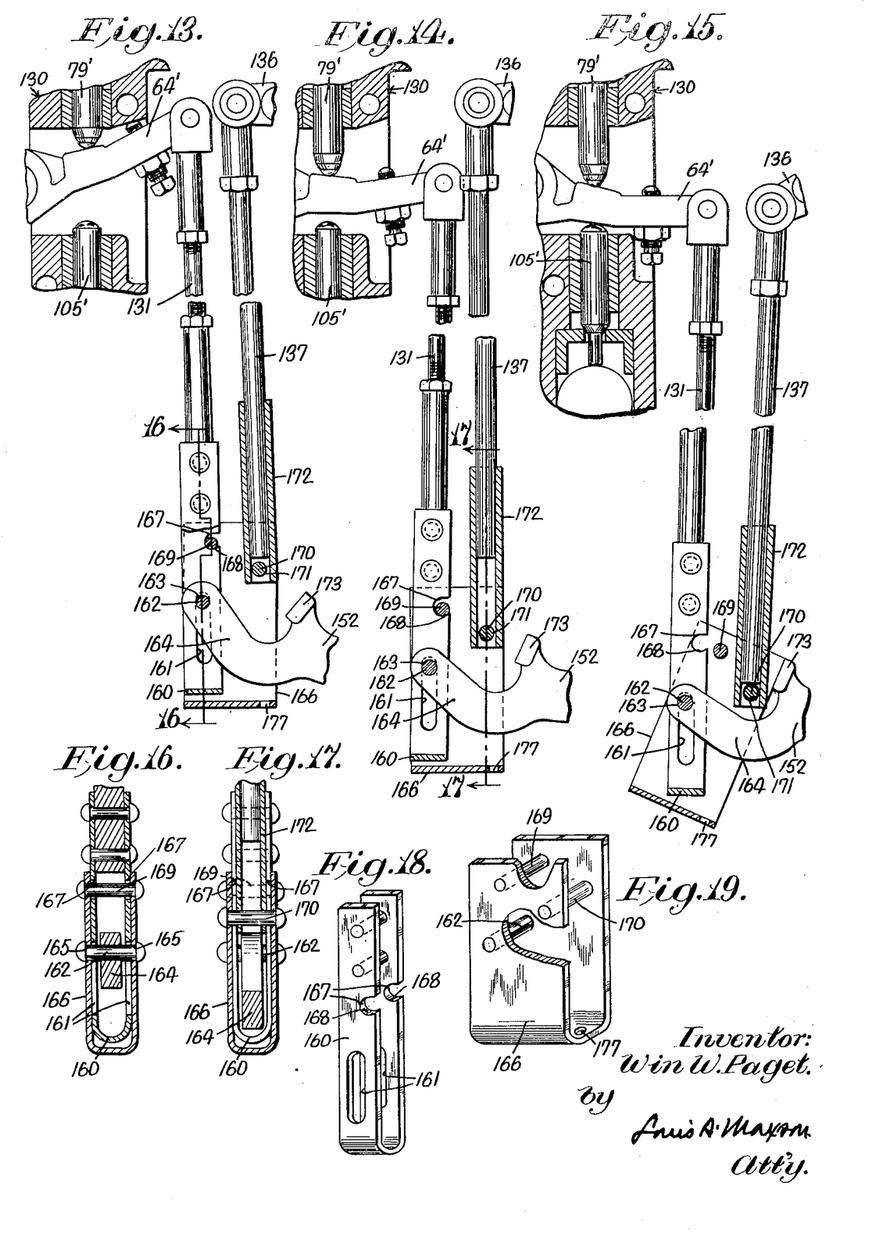
Figs. 13, 14 and 15 are fragmentary views showing different operating positions of the control mechanism of Figs. 10, 11 and 12.
Fig. 16 is a section on the planes of the line 16—16 of Fig. 13.
Fig. 17 is a section on the plane of the line 17—17 of Fig. 14.
Fig. 18 is a perspective view of the part hereinafter referred to as the inner stirrup member.
Fig. 19 is a perspective view, with parts broken away, of a part later referred to as the outer stirrup member.
Figures 20, 21, 22:
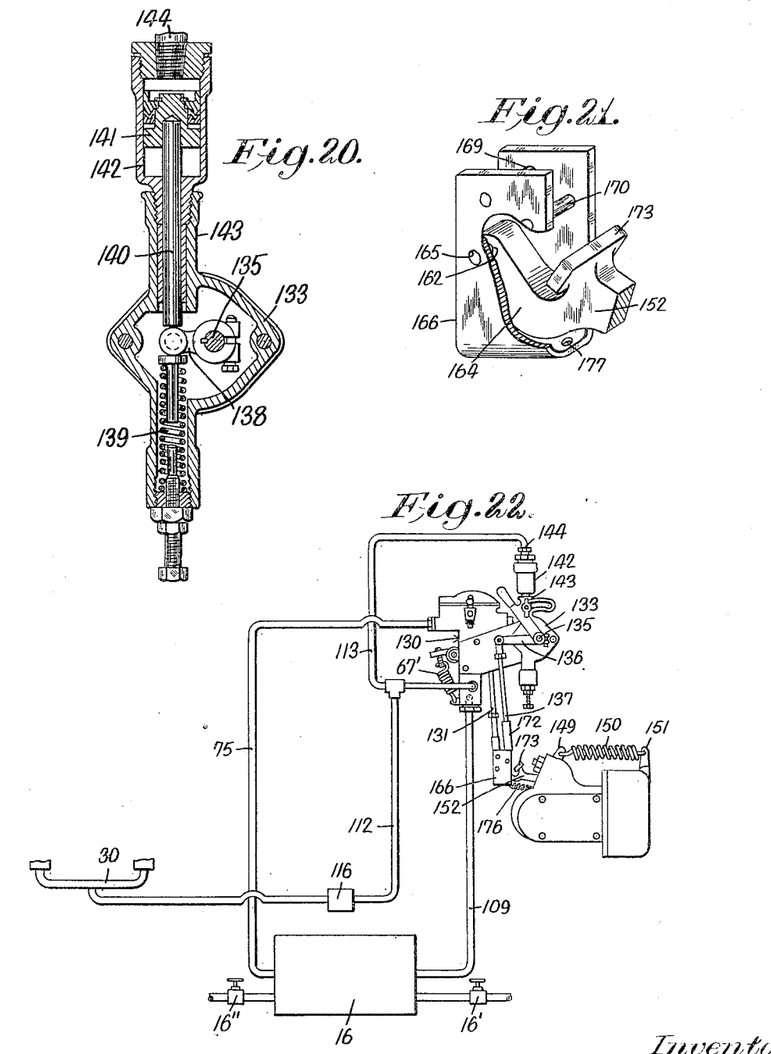
Fig. 20 is an enlarged central vertical section on the line 20—20 of Fig. 12 through the actuating portions of a slow-down device.
Fig. 21 is a fragmentary perspective view showing relationships of parts.
Fig. 22 is a diagrammatic view of the system shown in Fig. 10.

Before going further, it may be stated that in the position of the lever 152 corresponding to that shown in Figs. 10, 11 and 13, the engine speed will be approximately 1450 R. P. M. In the position shown in Fig. 14, the speed will be perhaps between 800 and 900 R. P. M. and in the position indicated in Fig. 15 about 450 R. P. M.

The following mechanism is provided for connecting the lever arm 152 with the operating links or rods 131 and 137 and enabling said rods to control said lever arm. This mechanism may be described as a latch type mechanism. The rod 131 carries at its lower end an elongated, inner, stirrup-like member 160 having, near its outer end, slots 161 in its opposite parallel walls, to cooperate with a pin 162 which passes through an opening 163 in the bent extremity 164 of the lever arm 152 and through openings 165 in the opposite sides of an outer stirrup-like member 166. The inner stirrup-like member 160 nearer than the slots 161 to its point of attachment to the rod 131 has notches 167 formed in the edge thereof toward the shaft 145, these notches being slightly undercut at 168 to facilitate their cooperation with another pin shortly to be described. A pin 169 extending between the opposite parallel walls of the outer stirrup member 166 is adapted to be received in the notches 167 in the relative position of the two stirrup members 160 and 166 shown in Figs. 10, 11, 13 and 14. The outer stirrup member 166 has a third transverse pin 170 by means of which it is pivotally connected at 171 to a sleeve or tube member 172, which slidingly receives in its opposite end the end of the operating rod 137 which is connected to the lever 136 of the slowdown mechanism 133. The lever arm 152 also carries near its end remote from the shaft 145 a transverse stop portion 173 which is adapted to engage and to limit swinging movement of the side portions of the outer stirrup member 166. The lever 148 has a still further short arm 175 to which a spring 176 is connected, this spring at its other end being engaged with the stirrup member 166 by means of a small hole 177. It will be noted that this spring tends to maintain the outer stirrup member 166 substantially parallel to the inner stirrup member 160 with the pin 169 in the notches 167. The spring 150 is relatively long and has a relatively flat spring rate and is desirably adjustably connected to the point of attachment 151 (or the latter may be made adjustable in any similar manner) and the force which it exerts when the lever 152 is in a position to cause the engine speed to be the aforesaid 800 R. P. M. is such as to be substantially the same as—desirably just exceeding—the force then exerted by the governor spring 126, in terms of turning movement on the shaft 145.

It will be noted that the spring 67' of the device 130 and the spring 150 coacting with the arm 149 of the lever 148, both act in a direction to swing the Diesel engine control shaft 145 in a direction to provide increases in engine speed. As above noted, the spring 150 exerts sufficient force to hold the engine at 800 R. P. M. (though it is not, as will be seen, the spring that holds the lever 152 in such position most of the time) and the spring 67' provides enough further force cumulatively to cause the engine speed to increase to, say, 1450 R. P. M.

When receiver pressure commences to rise above 90 pounds, the arm 64' will commence to be forced downwardly by the plunger 79' in a manner similar to that described with respect to the first form of the invention, and as the rod 131 moves downward, the lever arm 152 will move downward as rapidly as the downward motion of the notches 167 permits downward movement of the pin 169, the pin 169 resting on the lower side of the notches during the downward movement of the rod 131. When the lever arm 64' of the device 130 reaches the position in which it engages the plunger controlling the large ball valve (corresponding to the ball valve 101), the engine speed will be approximately 800 R. P. M. and the force exerted by the spring 150 tending to rotate the shaft 145 clockwise will then offset the force exerted by the then somewhat relaxed governor spring 126 tending to rotate the shaft 145 counterclockwise, but since the pin 169 will still be within the notches 167 there will be no wandering. However, the pin 169 will not at this time engage the lower wall of the notches and the pin 162 may engage the tops of the slots 161. If the compressor discharge pressure builds up to 110 pounds, so that the plunger 79' causes the lever 64' to force the plunger 105' to unseat the ball valve which corresponds to the ball valve 101, air will be admitted to the unloading plungers and to the slowdown plunger 140 and the latter will then move the rod 137 down against the pin 170 and through thrust exerted on this pin will cause the outer stirrup member 166 to swing, disengaging the pin 169 from the notches 167 and bringing the side of the stirrup member 166 against the transverse portion 173 on the lever arm 152, and then push the arm 152 further in a counterclockwise direction to reduce the tension of the spring 126 and so bring the engine down to the desired idling speed of approximately 450 R. P. M. During such further movement, the pin 162 may move downwardly with the outer stirrup member 166, travelling in the slots 161 in the then stationary inner stirrup member 160. As previously explained, the idling speed will be controlled by the adjustment of the stop screw 147.

After the receiver pressure is reduced again to approximately 100 pounds, the pressure exerted by the spring in the device 130 which corresponds to the spring 103 of the device 60, plus the pressure exerted on the area of the plunger 105' which is exposed to receiver pressure when the valve which corresponds to the ball valve 101 is unseated will be sufficient to move the lever 64' the very slight amount necessary to permit the seating of the ball valve, with a resultant reloading of the compressor and the bringing back of the compressor speed to approximately 800 R. P. M. When the pressure is vented from the cylinder 142 and the spring 139 has caused a return of the rod 137 to its normal relatively raised position and a freeing of the pin 170 for upward movement, the spring 176 will swing the outer stirrup member in a direction to cause the pin 169 to snap back into the grooves 167. The force exerted by the spring 150 will, at this time, as has been previously indicated, be sufficient to hold the pin 162 against the upper ends of the slots 161, and accordingly, the pin 169 will swing back into the notches 167 again. As the rod 131 moves upward with falling receiver pressure, it will pull the arm 152 upward, and the raising of the arm will be effected by lift imparted to the pin 169 by the lower, undercut walls of the notches 167 and the resultant lifting through the outer stirrup member 166 of the pin 162 which passes through the outer end of the lever arm 152.

Some of the similarities and important features of the two illustrative embodiments of my invention may be now briefly mentioned.

(a) In each a pressure responsive element subjected on one side to receiver pressure and on its opposite side to a pressure which is a predetermined amount less than receiver pressure when the latter is at the lower limit of the control cycle controls engine speed inversely to compressor discharge pressure throughout the range of loaded operation of the compressor and controls also a valve device which governs slowdown and unloading mechanisms.

(b) The ball valve 91 may have its loading spring (or its corresponding element in the second embodiment) adjusted so as to change the location of the cycle of operation on a pressure-speed diagram. For example, if it takes a pressure of 75 p. s. i. in the chamber 72 to unseat the ball valve 91 and an excess or unbalanced pressure of 15 p. s. i. at the opposite side of the diaphragm 73 just to start to move the control rod 79, i. e. a receiver pressure of 90 p. s. i., and 25 p. s. i. above 75 p. s. i., i. e. a receiver pressure of 100 p. s. i. to move the lever arm 64 over against the plunger 105, and the loading of the spring 93 was increased two pounds, it would require receiver pressures of 92 p. s. i. and 102 p. s. i. respectively to start to move the lever 64 and to bring it against the plunger 105. Similarly, if spring 93 had its compression slightly relieved, pressures of, say, 88 p. s. i. and 98 p. s. i. would effect the corresponding functions.

(c) With respect to the ball valve 101, it will be noted that it is controlled as to its unseating by the plunger 105, which is controlled by the diaphragm 73 and the control rod 79. Receiver pressure tends to maintain it seated and when it is unseated the spring 103 tends to reseat it. It is not therefore in any sense the same in its operation as the directly pressure responsive loading and unloading pilot valves commonly used in devices intended for comparable results.

(d) In both embodiments the diaphragm controlled lever acts, with increasing receiver pressures, to reduce the resistance offered by resilient means to forces produced by the weights of a centrifugal governor.

(e) In both embodiments, a valve mechanism is controlled by the diaphragm operated lever to supply air to effect compressor unloading and slowing down of the engine to an idling speed. In the gasoline engine driven unit, however, the slowdown device acts on a separate butterfly valve, whereas in the other, Diesel engine driven unit the slowdown device simply reduces further the spring pressure opposing the action of the governor weights.

The mode of operation of the first embodiment described may advantageously once more briefly be reviewed. Let it be assumed that the engine is warmed up and that there is a pressure in the receiver of 50 p. s. i.—a condition which will be recognized as a transitional stage between the cold engine—no receiver pressure condition and normal working conditions. The lever 64 is in the position of Fig. 3, the rod 79 is exerting a negligible pressure, because the fluid pressures at the opposite sides of the diaphragm 73 are the same. The valves 91 and 101 are seated. The compressor is loaded. The engine is operating at full speed, say, 1450 R. P. M. Receiver pressure goes on building up—to 60 p. s. i.—to 70 p. s. i.—to 75 p. s. i. At this point the pressure in chamber 72 reaches a value sufficient to crack the ball 91 off its seat, and so a differential between the pressures at the opposite sides of the diaphragm 73 will commence to build up. When receiver pressure reaches 80 p. s. i. the differential will be 5 p. s. i.; when it reaches 90 p. s. i. the differential will be 15 p. s. i. and that will be just sufficient so that with any further increase the rod 79 will commence to overcome the unbalanced force exerted by the spring 67, and so, as receiver pressure rises to 91 p. s. i., 92 p. s. i., etc. the lever 64 will be swung clockwise and effect a slackening of the tension of spring 58, and so reduce the spring force opposed to the governor weights. Accordingly, the compressor speed will be reduced, and if there is no air demand, or if the demand is less than the instantaneous rate of air delivery by the compressor so that the receiver pressure will continue to build up, the lever 64 will continue to swing clockwise, the compressor will continue to slow down, and at a speed of about 800 R. P. M. the lever 64 will be in engagement with the plunger 105. If the air delivery rate still exceeds air demand, there will be a further building up of receiver pressure without further slowing of compressor speed until, say, at a receiver pressure of 110 p. s. i. a force sufficient to unseat the ball valve is developed. This ball valve will then be forced from its seat by the plunger 105, which will close the port 107, and receiver pressure will pass to the unloading plungers and to the slowdown mechanism 114 and the throttle 118 will be moved to a position to slow down the compressor driving engine to an idling speed of, say, 450 R. P. M. Of course, with the compressor unloaded, no air will now be delivered to the receiver, and the compressor will continue to operate unloaded until receiver pressure is reduced again to 100 p. s. i. The reason for this 10 pound drop is that when the ball 101 is unseated a considerable additional area is exposed to receiver pressure and the force exerted by the spring 103 is very slight, and accordingly the plunger 105 will hold the ball unseated until the receiver pressure drops enough to cause the lever 64, under the action of the spring 67, the force due to the area at the end of the plunger 105 exposed to receiver pressure, and the pressure of the spring 103, to move counterclockwise the slight amount required to permit the plunger 105 to move to the left and permit seating of the ball valve and venting of the slowdown device 114 and of the air from the unloading plungers as earlier explained.

From the foregoing description, it will be evident that I have provided improved controls for gasoline and for Diesel engine driven compressors each of which is simple, certain in action, and effective to accomplish the objects hereinabove set forth.

It will of course be understood that the specific pressures referred to are illustrative only, and that any other values appropriate to practical operating conditions might have been selected and by appropriate proportioning and design be utilized. This application is a continuation-in-part of my earlier filed application Serial No. 673,425, filed May 31, 1946, now abandoned.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A regulating mechanism for an engine driven compressor having fluid actuated unloading means for the compressor and fuel regulating means for the engine, said regulating mechanism comprising, in combination, a control member, means operatively connecting said control member to the fuel regulating means for the engine, a pressure responsive device connected to said control member and operable by pressure fluid supplied thereto for actuating said control member to effect a reduction in fuel supply to the engine, means for supplying fluid discharged by the compressor to act continuously on said pressure responsive device in one direction, means for subjecting said pressure responsive device to a substantially uniform fluid pressure above atmospheric acting oppositely to compressor discharge pressure, and valve means controlled by said pressure responsive device and operating to control the supply of actuating fluid to the compressor unloading means.

2. A regulating mechanism for an engine driven compressor having fluid actuated unloading means for the compressor and fuel regulating means for the engine, said regulating mechanism comprising, in combination, a control member, means operatively connecting said control member to the fuel regulating means for the engine, a pressure responsive device connected to said control member and operable by pressure fluid supplied thereto for actuating said control member to effect a reduction in fuel supply to the engine, means for supplying fluid discharged by the compressor to act on said pressure responsive device in one direction, means for subjecting said pressure responsive device to a predetermined substantially uniform fluid pressure acting oppositely to compressor discharge pressure when compressor discharge pressure is at or above such predetermined pressure, means for bleeding off said uniform fluid pressure, and valve means controlled by said pressure responsive device and operating to control the flow of fluid relative to the compressor unloading means.

3. A regulating mechanism for an engine driven compressor having fluid actuated unloading means for the compressor and fuel regulating means for the engine, said regulating mechanism comprising, in combination, a control member, means operatively connecting said control member to the fuel regulating means for the engine, a pressure responsive device having oppositely facing areas for the action of fluid pressures thereon, said pressure responsive device connected to said control member and operable by pressure fluid supplied thereto for actuating said control member to effect a reduction in fuel supply to the engine, means for supplying to said oppositely facing areas fluid discharged by the compressor and fluid at substantially constant, above-atmospheric pressure, and means including a valve member movable by said pressure responsive device to a position permitting fluid to flow to the unloading means and operating in such position to prevent further movement of said control member by said pressure responsive device.

4. A regulating mechanism for an engine driven compressor having fluid actuated unloading means for the compressor and fuel regulating means for the engine, said regulating mechanism comprising, in combination, a control member, means operatively connecting said control member to the fuel regulating means for the engine, a pressure responsive device having oppositely facing areas for the action of fluid pressure thereon, said pressure responsive device connected to said control member and operable by pressure fluid supplied thereto for actuating said control member to effect a reduction in fuel supply to the engine, means for supplying to said oppositely facing areas fluid discharged by the compressor and fluid at substantially constant pressure, means operable at will for relieving the area subjected to substantially constant pressure from such pressure, and means including a valve member movable by said pressure responsive device to a position permitting fluid to flow to the unloading means and operating in such position to prevent further movement of said control member by said pressure responsive device.

5. A regulating mechanism for an engine driven compressor comprising, in combination, a control member, means operatively connecting said control member to a fuel regulating means for the engine, a pair of pressure responsive devices for moving said control member and each operative by pressure fluid supplied thereto to move said control member, when operatively connected thereto, positively in a direction to effect a reduction of fuel supply to the engine, means for alternatively operatively connecting said pressure responsive devices to said control member, means for subjecting continuously one of said pressure responsive devices to compressor discharge pressure, and means including a valve member movable by said one of said pressure responsive devices for controlling the supply of operating fluid to the other of said pressure responsive devices.

6. A regulating mechanism for an engine driven compressor the engine of which has fuel regulating means, said regulating mechanism comprising, in combination, a control member, means operatively connecting said control member to the fuel regulating means for the engine, a pair of pressure responsive devices connected to said control member and each operative by pressure fluid supplied thereto to move said control member, when operatively connected thereto, positively in a direction to effect a reduction of fuel supply to the engine, means for alternatively operatively connecting said pressure responsive devices to said control member, means for subjecting continuously one of said pressure responsive devices to compressor discharge pressure, means for supplying compressor discharge pressure fluid to the other of said pressure responsive devices, and means including a valve member adapted to be actuated by said one of said pressure responsive devices for controlling the flow of fluid in said fluid supply means, said valve member movable to a position permitting fluid flow to the other of said pressure responsive devices as said control member is moved to a predetermined position by said one of said pressure devices.

7. A regulating mechanism for an engine driven compressor having fluid actuated unloading means for the compressor and fuel regulating means for the engine, said regulating mechanism comprising, in combination, a control member operatively connected to the fuel regulating means for the engine, a pair of pressure responsive devices alternatively operatively connectible to said control member at one end thereof and each operable by pressure fluid supplied thereto to swing said control member in a direction to effect a reduction of fuel supply to the engine, means for supplying pressure fluid continuously to one of said pressure responsive devices from a receiver connected to the compressor, and means including a valve member actuated by said one of said pressure responsive devices for effecting controlled supply of fluid to the other of said pressure responsive devices and to the unloading means.

8. A regulating mechanism for an engine driven compressor unit having fuel regulating means for the engine, said regulating mechanism comprising, in combination, a lever movable in a predetermined direction to cause the fuel regulating means for the engine to reduce engine speed, a pressure responsive device operatively connectible to said lever and operable by pressure fluid supplied thereto for actuating said lever positively in one direction to effect a reduction in engine speed, means for supplying compressor discharge pressure continuously to said pressure responsive device while said unit is in operation, a second pressure responsive device also operatively connectible to said lever and operable by pressure fluid supplied thereto for positively actuating said lever in the same direction as said first mentioned pressure responsive device to effect a further reduction in engine speed, and means under the control of said first mentioned pressure responsive device for controlling fluid supply to said second pressure responsive device.

9. A regulating mechanism for an engine driven compressor unit having fuel regulating means for the engine, said regulating mechanism comprising, in combination, a lever movable in a predetermined direction to cause the fuel regulating means for the engine to reduce engine speed, a pressure responsive device operatively connectible to said lever and operable by pressure fluid supplied thereto for actuating said lever positively in one direction to effect a reduction in engine speed, means for supplying compressor discharge pressure continuously to said pressure responsive device to act on it in one direction while said unit is in operation and at will to vent the pressure responsive device to atmosphere to prevent action of the compressor discharge pressure on the pressure responsive device, a second pressure responsive device also operatively connectible to said lever and operable by pressure fluid supplied thereto for positively actuating said lever in the same direction as said first mentioned pressure responsive device to effect a further reduction in engine speed, means under the control of said first mentioned pressure responsive device for controlling fluid supply to said second pressure responsive device.

10. A controlling mechanism for regulating the speed of an internal combustion engine through regulation of its fuel supply including a throttle, a lever movable to control said throttle, speed responsive means acting to move said lever in a direction to close said throttle, a plurality of springs opposing the action of said speed responsive means, and means for varying the force exerted by one of said springs including a device movable, when in an intermediate position, oppositely to increase or decrease the tension of said last mentioned spring, means for moving said device automatically in a direction to increase the tension of said spring, and pressure responsive means for moving said device in the opposite direction including a pressure responsive element, means for subjecting the opposite sides of said element to a pressure fluid from a common source, and means for venting fluid from one side of said element when the pressure from said source builds up above a predetermined value.

11. A controlling mechanism for regulating the speed of an internal combustion engine through regulation of its fuel supply including a throttle, a lever movable to control said throttle, speed responsive means acting to move said lever in a direction to close said throttle, a plurality of springs opposing the action of said speed responsive means, and means for varying the force exerted by one of said springs including a device movable, when in an intermediate position, oppositely to increase or decrease the tension of said last mentioned spring, means for moving said device automatically in a direction to increase the tension of said spring, and pressure responsive means for moving said device in the opposite direction including a pressure responsive element, means for subjecting the opposite sides of said element to a pressure fluid from a common source, means for bleeding fluid from one side of said element when the pressure from said source builds up above a predetermined value, to maintain the pressure at said side constant, and means for at will preventing the maintenance of fluid under substantial pressure at said side.

12. A controlling mechanism for regulating the speed of an internal combustion engine through regulation of its fuel supply including a throttle, a lever movable to control said throttle, speed responsive means acting to move said lever in a direction to close said throttle, a plurality of springs opposing the action of said speed responsive means, and means for varying the force exerted by one of said springs including a device movable, when in an intermediate position, oppositely to increase or decrease the tension of said last mentioned spring, means for moving said device automatically in a direction to increase the tension of said spring, and pressure responsive means for moving said device in the opposite direction including a pressure responsive element, means for subjecting the opposite sides of said element to a pressure fluid from a common source, and means for venting fluid from one side of said element when the pressure from said source builds up above a predetermined value, said last mentioned means having associated therewith means for altering the predetermined value at which it becomes operative.

13. A controlling mechanism for regulating the speed of an internal combustion engine through regulation of its fuel supply including a throttle, a lever movable to control said throttle, speed responsive means acting to move said lever in a direction to close said throttle, a plurality of springs opposing the action of said speed responsive means, and means for varying the force exerted by one of said springs including a device movable, when in an intermediate position, oppositely to increase or decrease the tension of said last mentioned spring, means for moving said device automatically in a direction to increase the tension of said spring, and pressure responsive means for moving said device in the opposite direction including a pressure responsive element, means for subjecting the opposite sides of said element to a pressure fluid from a common source, means for bleeding fluid from one side of said element when the pressure from said source builds up above a predetermined value, said last mentioned means having associated therewith means for altering the predetermined value at which it becomes operative, and means for venting fluid freely from said one side of said element at will.

14. A controlling device for a compressor unit for effecting through a variation in the tension of a governor spring a control of engine speed and through the supply and venting of fluid pressure a further control of engine speed and compressor unloading and reloading, said controlling device comprising a lever swingable to vary tension of a governor spring and in an extreme position adapted to actuate a valve for supplying and venting fluid pressure for the purposes set forth, a valve for supplying and venting fluid for the purposes set forth movable by said lever in one extreme position of the latter, and actuating means for said lever including spring means for swinging the same in one direction and pressure fluid responsive means for swinging said lever in the opposite direction, said pressure fluid responsive means including a diaphragm, means actuated by said diaphragm for moving said lever in opposition to said spring means, means for delivering to both sides of said diaphragm compressor discharge pressure, and means for venting from one side of said diaphragm all pressure in excess of a predetermined value.

15. A controlling device for a compressor unit for effecting through a variation in the tension of a governor spring a control of engine speed and through the supply and venting of fluid pressure a further control of engine speed and compressor unloading and reloading, said controlling device comprising a lever swingable to vary tension of a governor spring and in an extreme position adapted to actuate a valve for supplying and venting fluid pressure for the purposes set forth, a valve for supplying and venting fluid for the purposes set forth movable by said lever in one extreme position of the latter, and actuating means for said lever including spring means for swinging the same in one direction and pressure fluid responsive means for swinging said lever in the opposite direction, said pressure fluid responsive means including a diaphragm, means actuated by said diaphragm for moving said lever in opposition to said spring means, means for delivering to both sides of said diaphragm compressor discharge pressure, means for bleeding from one side of said diaphragm all pressure in excess of a predetermined value, and means for venting pressure freely from said last mentioned side of said diaphragm.

16. A controlling device for a compressor unit for effecting through a variation in the tension of a governor spring a control of engine speed and through the supply and venting of fluid pressure a further control of engine speed and compressor unloading and reloading, said controlling device comprising a lever swingable to vary tension of a governor spring and in an extreme position adapted to actuate a valve for supplying and venting fluid pressure for the purposes set forth, a valve for supplying and venting fluid for the purposes set forth movable by said lever in one extreme position of the latter, and actuating means for said lever including spring means for swinging the same in one direction and pressure fluid responsive means for swinging said lever in the opposite direction, said pressure fluid responsive means including a diaphragm, means actuated by said diaphragm for moving said lever in opposition to said spring means, means for delivering compressor discharge pressure freely to one side of said diaphragm, means for delivering compressor discharge pressure in restricted volume to the other side of said diaphragm, and adjustable pressure responsive means for venting pressure from said other side of said diaphragm to limit the pressure at said latter side.

17. A controlling device for a compressor unit for effecting through a variation in the tension of a governor spring a control of engine speed and through the supply and venting of fluid pressure a further control of engine speed and compressor unloading and reloading, said controlling device comprising a valve for supplying and venting fluid for the purposes set forth and a lever swingable to vary the tension of a governor spring and in an extreme position adapted to actuate said valve, and actuating means for said lever including spring means for swinging the same in one direction and pressure fluid responsive means for swinging said lever in the opposite direction, said pressure fluid responsive means including a diaphragm, means actuated by said diaphragm for moving said lever in opposition to said spring means, means for delivering compressor discharge pressure freely to one side of said diaphragm, means for delivering compressor discharge pressure in restricted volume to the other side of said diaphragm, adjustable pressure responsive means for venting pressure from said other side of said diaphragm to limit the pressure at said latter side, and means for venting pressure from said latter side more rapidly than the supply thereto.

18. A controlling device for a compressor unit for effecting through a variation in the tension of a governor spring a control of engine speed and through the supply and venting of fluid pressure a further control of engine speed and compressor unloading and reloading, said controlling device comprising a valve for supplying and venting fluid pressure for the purposes set forth and a lever swingable to vary the tension of a governor spring and in an extreme position adapted to actuate said valve, and actuating means for said lever including spring means for swinging the same in one direction and pressure fluid responsive means for swinging said lever in the opposite direction, said pressure fluid responsive means including an element having areas at its opposite sides for the action thereon of pressure fluid, means actuated by said element for moving said lever in opposition to said spring means, means for delivering compressor discharge pressure freely to one side of said element, means for delivering compressor discharge pressure in restricted volume to the other side of said element, and a spring loaded relief valve having provision for the adjustment of the load thereon for precluding the building up of pressure in excess of a given value at said latter side.

19. A controlling device for a compressor unit for effecting through a variation in the tension of a governor spring a control of engine speed and through the supply and venting of fluid pressure a further control of engine speed and compressor unloading and reloading, said controlling device comprising a valve for supplying and venting fluid pressure for the purposes set forth and a lever swingable to vary the tension of a governor spring and in an extreme position adapted to actuate said valve, and actuating means for said lever including spring means for swinging the same in one direction and pressure fluid responsive means for swinging said lever in the opposite direction, said pressure fluid responsive means including an element having areas at its opposite sides for the action thereon of pressure fluid, means actuated by said element for moving said lever in opposition to said spring means, means for delivering compressor discharge pressure freely to one side of said element, means for delivering compressor discharge pressure in restricted volume to the other side of said element, a spring loaded relief valve having provision for the adjustment of the load thereon for precluding the building up of pressure in excess of a given value at said latter side, and a vent valve for establishing free communication between said latter side and the atmosphere.

20. A controlling device for a compressor unit for effecting through a variation in the tension of a governor spring a control of engine speed and through the supply and venting of fluid pressure a further control of engine speed and compressor unloading and reloading, said controlling device comprising a valve for supplying and venting fluid for the purposes set forth and a lever swingable to vary the tension of a governor spring and in an extreme position adapted to actuate said valve, and actuating means for said lever including spring means for swinging the same in one direction and pressure fluid responsive means for swinging said lever in the opposite direction, said pressure fluid responsive means including an element having areas at its opposite sides for the action thereon of pressure fluid, means actuated by said element for moving said lever in opposition to said spring means, means for subjecting the area at one side of said element to compressor discharge pressure, and means for subjecting the area at the other side of said element to an above-atmospheric fluid pressure less than and independent of variations in the compressor discharge pressure during the normal operating cycle of the unit.

21. A controlling device for a compressor unit for effecting through a variation in the tension of a governor spring a control of engine speed and through the supply and venting of fluid pressure a further control of engine speed and compressor unloading and reloading, said controlling device comprising a valve for supplying and venting fluid pressure for the purposes set forth and a lever swingable to vary the tension of a governor spring and in an extreme position adapted to actuate said valve, and actuating means for said lever including spring means for swinging the same in one direction and pressure fluid responsive means for swinging said lever in the opposite direction, said pressure fluid responsive means including an element having areas at its opposite sides for the action thereon of pressure fluid, means actuated by said element for moving said lever in opposition to said spring means, means for subjecting the area at one side of said element to compressor discharge pressure, means for subjecting the area at the other side of said element to a fluid pressure less than and independent of variations in the compressor discharge pressure during the normal operating cycle of the unit, and means for allowing the escape of such fluid pressure at will.

22. In a speed controlling apparatus for an internal combustion engine driven compressor the driving engine of which has a governor including weights and a spring opposing a force to the action of the weights, in combination, a lever movable to vary the spring force opposed to the action of the weights of the engine governor, means providing for control of the position of said lever variably in accordance with variations in compressor discharge pressure between predetermined limits including an operating element operatively connectible with said lever and having its position varied within predetermined limits as compressor discharge pressure varies, means operable when compressor discharge pressure attains to a predetermined maximum value and until compressor discharge pressure drops a predetermined amount from such maximum value for exerting a further control on said lever and including a second operating element also operatively connectible with said lever and having inactive and active positions, and means for operatively connecting said operating elements in controlling relation to said lever including a member pivotally supported on said lever and carrying a pair of pins, means supported by one of said pins and having telescopic relation with said second mentioned operating element for maintaining said element in an operative relation to said pin so that it may exert a thrust on the latter when exerting its controlling function, but permitting movement of said pin relative to said element when said element is not exerting its controlling function, and means supported by said first mentioned operating element providing a lost motion connection with said lever and a releasable latching connection with the other of said pins.

23. In a speed controlling apparatus for an internal combustion engine driven compressor the driving engine of which has a governor including weights and a spring opposing a force to the action of the weights, in combination, a lever movable to vary the spring force opposed to the action of the weights of the engine governor, means providing for control of the position of said lever variably in accordance with variations in compressor discharge pressure between predetermined limits including an operating element operatively connectible with said lever and having its position varied within predetermined limits as compressor discharge pressure varies, means operable when compressor discharge pressure attains to a predetermined maximum value and until compressor discharge pressure drops a predetermined amount from such maximum value for exerting a further control on said lever and including a second operating element also operatively connectible with said lever and having inactive and active positions, and means for operatively connecting said operating elements in controlling relation to said lever including a member carrying a pair of pins and having a third pin pivotally connecting it to said lever, means supported by one of said pair of pins and having telescopic relation with said second mentioned operating element for maintaining said element in an operative relation to said pin so that it may exert a thrust on the latter when exerting its controlling function but permitting movement of said pin relative to said element when said element is not exerting its controlling function, and a second member supported by said first mentioned operating element and having slots slidably receiving portions of said third pin and notches releasably receiving the other one of said pair of pins.

24. In a speed controlling apparatus for an internal combustion engine driven compressor the driving engine of which has a governor including weights and a spring opposing a force to the action of the weights, in combination, a lever movable to vary the spring force opposed to the action of the weights of the engine governor, means providing for control of the position of said lever variably in accordance with variations in compressor discharge pressure between predetermined limits including an operating element operatively connectible with said lever and having its position varied within predetermined limits as compressor discharge pressure varies, means operable when compressor discharge pressure attains to a predetermined maximum value and until compressor discharge pressure drops a predetermined amount from such maximum value for exerting a further control on said lever and including a second operating element also operatively connectible with said lever and having inactive and active positions, and means for operatively connecting said operating elements in controlling relation to said lever including a member carrying a pair of pins and having a third pin pivotally connecting it to said lever, means supported by one of said pair of pins and having telescopic relation with said second mentioned operating element for maintaining said element in an operative relation to said pin so that it may exert a thrust on the latter when exerting its controlling function but permitting movement of said pin relative to said element when said element is not exerting its controlling function, a second member supported by said first mentioned operating element and having slots slidably receiving portions of said third pin and notches releasably receiving the other one of said pair of pins, and means for yieldingly maintaining said first mentioned member in a position to dispose said last mentioned pin in said notches except when said second mentioned operating element is exerting its controlling function.

25. In a speed controlling apparatus for an internal combustion engine driven compressor the driving engine of which has a governor including weights and a spring opposing a force to the action of the weights, in combination, a lever movable to vary the spring force opposed to the action of the weights of the engine governor, means providing for control of the position of said lever variably in accordance with variations in compressor discharge pressure between predetermined limits including an operating element operatively connectible with said lever and having its position varied within predetermined limits as compressor discharge pressure varies, means operable when compressor discharge pressure attains to a predetermined maximum value and until compressor discharge pressure drops a predetermined amount from such maximum value for exerting a further control on said lever and including a second operating element also operatively connectible with said lever and having inactive and active positions, and means for operatively connecting said operating elements in controlling relation to said lever including a member carrying a pair of pins and having a third pin pivotally connecting it to said lever, means supported by one of said pair of pins and having telescopic relation with said second mentioned operating element for maintaining said element in an operative relation to said pin so that it may exert a thrust on the latter when exerting its controlling function but permitting movement of said pin relative to said element when said element is not exerting its controlling function, a second member supported by said first mentioned operating element and having slots slidably receiving portions of said third pin and notches releasably receiving the other one of said pair of pins, and means for yieldingly maintaining said first mentioned member in a position to dispose said last mentioned pin in said notches except when said second mentioned operating element is exerting its controlling function, said lever having stop means thereon for limiting swinging movement of said first mentioned member relative to said lever under the action of said second operating element.

26. A controlling device for an engine driven compressor unit for effecting, through a variation in the tension of a governor spring, a control of engine speed, said controlling device comprising a lever swingable to vary the tension of a governor spring, and actuating means for said lever including spring means for swinging the same in one direction and pressure fluid responsive means for swinging said lever in the opposite direction, said pressure fluid responsive means including an element having areas at its opposite sides for the action thereon of fluid pressure, means actuated by said element for moving said lever in opposition to said spring means, means for delivering compressor discharge pressure freely to one side of said element, and means for subjecting the area at the other side of said element to an above-atmospheric fluid pressure less than and independent of variations in the compressor discharge pressure during the normal operating cycle of the unit.

27. A controlling device for an engine driven compressor unit for effecting, through a variation in the tension of a governor spring, a control of engine speed, said controlling device comprising a lever swingable to vary the tension of a governor spring, and actuating means for said lever including spring means for swinging the same in one direction and pressure fluid responsive means for swinging said lever in the opposite direction, said pressure fluid responsive means including an element having areas at its opposite sides for the action thereon of fluid pressure, means actuated by said element for moving said lever in opposition to said spring means, means for subjecting the opposite sides of said element to a pressure fluid from a common source, and means for venting fluid from one side of said element automatically when the pressure from said source builds up above a predetermined value.

28. A controlling device for an engine driven compressor unit for effecting, through a variation in the tension of a governor spring, a control of engine speed, said controlling device comprising a lever swingable to vary the tension of a governor spring, and actuating means for said lever including spring means for swinging the same in one direction and pressure fluid responsive means for swinging said lever in the opposite direction, said pressure fluid responsive means including an element having areas at its opposite sides for the action thereon of fluid pressure, means actuated by said element for moving said lever in opposition to said spring means, means for subjecting the opposite sides of said element to a pressure fluid from a common source, means for venting fluid from one side of said element automatically when the pressure from said source builds up above a predetermined value, and means for venting fluid from said one side of said element at will.

29. A controlling device for an engine driven compressor unit for effecting, through a variation in the tension of a governor spring, a control of engine speed, said controlling device comprising a lever swingable to vary the tension of a governor spring, and actuating means for said lever including spring means for swinging the same in one direction and pressure fluid responsive means for swinging said lever in the opposite direction, said pressure fluid responsive means including an element having areas at its opposite sides for the action thereon of fluid pressure, means actuated by said element for moving said lever in opposition to said spring means, means for delivering compressor discharge pressure freely to one side of said element, means for delivering compressor discharge pressure in restricted volume to the other side of said element, and a spring loaded relief valve having provision for the adjustment of the load thereon for precluding the building up of pressure in excess of a given value at said latter side.

30. A controlling device for an engine driven compressor unit for effecting, through a variation in the tension of a governor spring, a control of engine speed, said controlling device comprising a lever swingable to vary the tension of a governor spring, and actuating means for said lever including spring means for swinging the same in one direction and pressure fluid responsive means for swinging said lever in the opposite direction, said pressure fluid responsive means including an element having areas at its opposite sides for the action thereon of fluid pressure, means actuated by said element for moving said lever in opposition to said spring means, means for delivering compressor discharge pressure freely to one side of said element, means for delivering compressor discharge pressure in restricted volume to the other side of said element, a spring loaded relief valve having provision for the adjustment of the load thereon for precluding the building up of pressure in excess of a given value at said latter side, and means for venting pressure from said latter side at will having a flow capacity exceeding the flow capacity of said means for delivering compressor discharge pressure in restricted volume.

31. A controlling device for an engine driven compressor unit for effecting, through a variation in the tension of a governor spring, a control of engine speed, said controlling device comprising a lever swingable to vary the tension of a governor spring, and actuating means for said lever including spring means for swinging the same in one direction and pressure fluid responsive means for swinging said lever in the opposite direction, said pressure fluid responsive means including an element having areas at its opposite sides for the action thereon of fluid pressure, means including an operating rod actuated by said element for moving said lever in opposition to said spring means, means for subjecting the area at one side of said element to compressor discharge pressure, and means for subjecting the area at the other side of said element to a fluid pressure less than compressor discharge pressure including means cooperating with said operating rod to form a restricted fluid supply passage and a relief valve set to open at a pressure below the compressor discharge pressure prevailing during the normal operating cycle of the unit.

WIN W. PAGET.

REFERENCES CITED

The following references are of record in the file of this patent:

UNITED STATES PATENTS

| Number | Name | Date |
|---|---|---|
| 1,550,875 | Carpenter | Aug. 25, 1925 |
| 1,550,876 | Carpenter | Aug. 25, 1925 |
| 2,171,285 | Baker | Aug. 29, 1939 |
| 2,178,660 | Carpenter | Nov. 7, 1939 |
| 2,212,631 | Baker | Aug. 27, 1940 |
| 2,421,872 | Evelyn | June 10, 1947 |